US011832171B2

(12) United States Patent
Dubesset et al.

(10) Patent No.: US 11,832,171 B2
(45) Date of Patent: Nov. 28, 2023

(54) METHOD FOR TOGGLING OF A MANAGEMENT ENTITY IN A TELECOMMUNICATIONS NETWORK

(71) Applicant: Orange, Paris (FR)

(72) Inventors: Laurent Dubesset, Châtillon (FR);
Antoine Mouquet, Châtillon (FR);
Xiaofeng Huang, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 161 days.

(21) Appl. No.: 16/756,818

(22) PCT Filed: Oct. 12, 2018

(86) PCT No.: PCT/FR2018/052541
§ 371 (c)(1),
(2) Date: Apr. 16, 2020

(87) PCT Pub. No.: WO2019/077239
PCT Pub. Date: Apr. 25, 2019

(65) Prior Publication Data
US 2020/0245236 A1    Jul. 30, 2020

(30) Foreign Application Priority Data

Oct. 17, 2017   (FR) ...................................... 1759745

(51) Int. Cl.
*H04W 24/04*        (2009.01)
*H04W 48/18*        (2009.01)
(Continued)

(52) U.S. Cl.
CPC ........... *H04W 48/18* (2013.01); *H04L 67/148* (2013.01); *H04W 8/14* (2013.01); *H04W 24/04* (2013.01);
(Continued)

(58) Field of Classification Search
CPC ....... H04W 48/18; H04W 8/14; H04W 24/04; H04W 36/0033; H04W 36/12;
(Continued)

(56) References Cited

U.S. PATENT DOCUMENTS

2009/0176496 A1\* 7/2009 Li ....................... H04W 36/385
455/437
2017/0135010 A1\* 5/2017 Iwai ....................... H04W 88/14
(Continued)

OTHER PUBLICATIONS

Huawei et al, "TS 23.501: AMF failure handling", vol. SA WG2, No. Sophia Antipolis, France; Aug. 21, 2017-Aug. 25, 2017, Aug. 21, 2017 (Aug. 21, 2017), 3GPP Draft; S2-175531-23501_AMF FAILUREV1.0, 3rd Generation Partnership Project (3GPP), Mobile Competence Centre ; 650, Route Des Lucioles ; F-06921 (Year: 2017).\*

(Continued)

*Primary Examiner* — Peter P Chau
(74) *Attorney, Agent, or Firm* — Knobbe, Martens, Olson & Bear, LLP

(57) ABSTRACT

A method for toggling of a management entity in a telecommunications network is described, in which the network operator has defined at least one given set of at least three management entities. In one aspect, the method includes, for a first management entity of the set, as long as said first management entity is in service, during the registration of at least one client device on the network, the first management entity taking charge of this client device. The client device records the identity of the first management entity, as well as the identity of a second management entity of said set, which is provided to it by the first management entity. The first management entity shares or synchronizes with said second management entity the context data relating to this client device. If the first management entity goes off-service, each second management entity is informed thereof and takes (Continued)

Figure 2A:
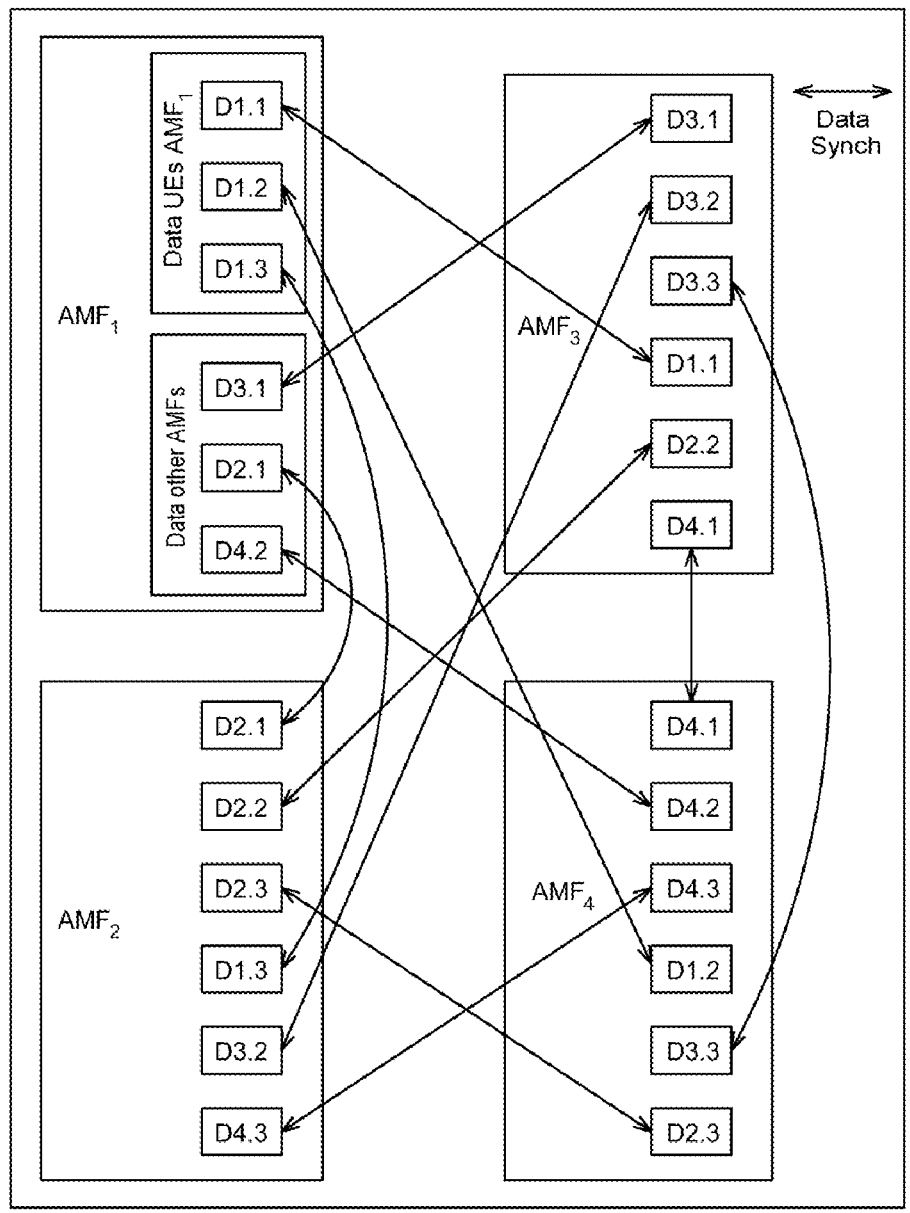

charge of the client devices for which it has shared or synchronized the context data with the first management entity.

18 Claims, 4 Drawing Sheets

(51) Int. Cl.
| | |
|---|---|
| *H04L 67/148* | (2022.01) |
| *H04W 8/14* | (2009.01) |
| *H04W 36/00* | (2009.01) |
| *H04W 36/12* | (2009.01) |
| *H04W 60/00* | (2009.01) |

(52) U.S. Cl.
CPC ....... *H04W 36/0033* (2013.01); *H04W 36/12* (2013.01); *H04W 60/005* (2013.01)

(58) Field of Classification Search
CPC ..... H04W 60/005; H04W 60/00; H04W 8/24; H04L 67/148
See application file for complete search history.

(56) References Cited

U.S. PATENT DOCUMENTS

| | | | | |
|---|---|---|---|---|
| 2017/0195926 | A1* | 7/2017 | Iwai | H04W 36/12 |
| 2018/0227873 | A1* | 8/2018 | Vrzic | H04W 28/26 |
| 2019/0387407 | A1* | 12/2019 | Jost | H04W 12/104 |
| 2020/0162888 | A1* | 5/2020 | Zong | H04W 8/08 |
| 2020/0245127 | A1* | 7/2020 | Zong | H04W 36/0077 |

OTHER PUBLICATIONS

Huawei et al, "TS 23.501: Association between the GUAMI and AMF instance", vol. SA WG2, No. San Jose Del Cabo, Mexico; Jun. 26, 2017-Jun. 30, 2017, Jun. 25, 2017 (Jun. 25, 2017), 3GPP Draft; S2-174327_TS 23.501_Association Between the GUAMI and AMF Instance_V1.2, 3rd Generation Partnership Project (3GPP), (Year: 2017).*

International Search Report dated Apr. 1, 2019 for PCT/FR2018/052541, filed Oct. 12, 2018.

Huawei et al, "TS 23.501: AMF failure handling", vol. SA WG2, No. Sophia Antipolis, France; Aug. 21, 2017-Aug. 25, 2017, Aug. 21, 2017 (Aug. 21, 2017), 3GPP Draft; S2-175531-23501_AMF Failure_V1.0, 3rd Generation Partnership Project (3GPP), Mobile Competence Centre ; 650, Route Des Lucioles ; F-06921.

Huawei et al, "TS 23.501: AMF failure handling", vol. SA WG2, No. Sophia Antipolis, France; Aug. 21, 2017-Aug. 25, 2017, Aug. 29, 2017 (Aug. 29, 2017), 3GPP Draft; S2-176572_6522_5531-23501_AMF Failure_V1.7, 3rd Generation Partnership Project (3GPP), Mobile Competence Centre ; 650, Route Des Lucioles ; F-06921 Sophia-Antipolis Cedex ; France.

Huawei et al, "TS 23.501: Association between the GUAMI and AMF instance", vol. SA WG2, No. San Jose Del Cabo, Mexico; Jun. 26, 2017-Jun. 30, 2017, Jun. 25, 2017 (Jun. 25, 2017), 3GPP Draft; S2-174327_TS 23.501_Association Between the GUAMI and AMF Instance_V1.2, 3rd Generation Partnership Project (3GPP), Mobile Competence Centre ; 650, Route Des Lucioles ; F-06921 Sophia-Ant.

3rd Generation Partnership Project; Technical Specification Group Services and System Aspects; System Architecture for the 5G System; Stage 2 (Release 15), 3GPP Standard ; Technical Specification ; 3GPP TS 23.501, 3rd Generation Partnership Project (3GPP), Mobile Competence Centre ; 650, Route Des Lucioles ; F-06921 Sophia-Antipolis Cedex ; France,vol. SA WG2, No. V1.4.0, Sep. 28, 2017, (Sep. 28, 2017), p. 1-152.

* cited by examiner

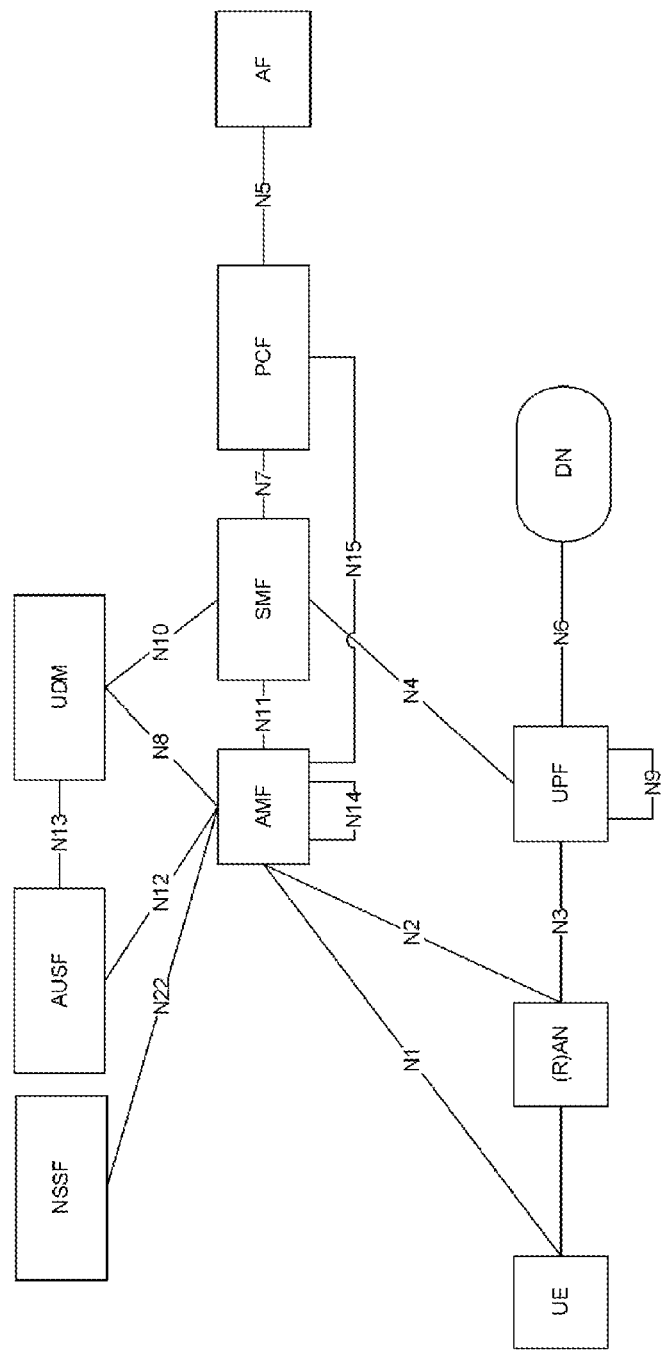

METHOD FOR TOGGLING OF A MANAGEMENT ENTITY IN A TELECOMMUNICATIONS NETWORK

RELATED APPLICATIONS

This application is the U.S. National Phase of Application No. PCT/FR2018/052541 entitled "METHOD FOR TOGGLING OF A MANAGEMENT ENTITY IN A TELECOMMUNICATIONS NETWORK" and filed Oct. 12, 2018, which claims the benefit of French Patent Application No. 1759745, filed Oct. 17, 2017, each of which is incorporated by reference in its entirety.

The present invention relates to a method for toggling a management device in a telecommunications network, in particular a telecommunications network comprising a mobile network of fifth generation (5G) such as defined by the 3GPP (3rd Generation Partnership Project).

As explained in the on-line encyclopedia "Wikipedia", 5G technology could allow telecommunication bitrates of several gigabits of data per second, i.e. up to 1000 times greater than the bitrates of mobile networks in 2010, and up to 100 times greater than those of 4G by 2020. These data bitrates are liable to respond to the growing demand for data with the boom in "smartphones" and network-connected communicating objects. This type of network ought to favor "cloud computing", integration and interoperability of communicating objects and of "smartgrids" and other so-called smart networks, in a home-automation environment and in a "smart town". It would then be possible to develop 3D or holographic imaging, "datamining", the management of "big data" and that of the Internet of Everything, an expression evoking a world where all computers and peripherals could inter-communicate. Other applications relate for example to complex multi-player and interactive games, and instantaneous assisted and automatic translation.

Several issues have been identified, such as:
  economic issues related to an emergent market, potentially rich in new outlets and applications; 5G could for example allow new digital usages in varied sectors such as health (automatic or remote diagnosis, remotely controlled surgery and medication), work (teleworking), deployment of communicating objects (including driverless cars and other vehicles), detectors and sensors of e-commerce, "smartgrids", artificial intelligence, security (teleprotection, management of flows of people, vehicles and commodities, goods and services in real time), education and access to information;
  environmental and sanitary issues relating to the effects of the multiplication in the number and power of antennas and relays in terms of electromagnetic nuisance and environmental health;
  energy issues consisting in obtaining better energy efficiency for powering mobile equipments and the Internet network as a whole.

Dealing with these issues will lead naturally to an enriched client experience, on condition however that these networks offer high operating reliability.

In this regard, a well-known danger in communication networks is the following: if, following a failure, a management device loses the context data relating to the client equipments ("User Equipments", or UEs) that it manages, these client equipments are constrained to undertake a new initial registration (with authentication). The number of client equipments having to reregister in a short space of time generally being significant, this failure risks causing an overload of other elements of the network, and possibly a failure of one at least of these other elements ("domino effect").

The 3GPP document TS 23.501 has taken this danger into consideration in relation specifically to a management device of a mobile network called "AMF" (initials of the words "Access and Mobility Management Function"). This document defines an "AMF Set", which consists of a set of AMFs serving a certain geographical area and a certain network slice (it is recalled in this regard that the technique of cutting a telecommunications network into "slices" ("network slicing"), described in the 3GPP document TR 23.799, allows the operator of the network to create "tailored" sub-networks, capable of providing optimized solutions for very varied scenarios with very diverse constraints in terms of functionality and performance). It will be noted that it is possible to have several AMF Sets per geographical area and per network slice.

The document TS 23.501 also defines the "GUAMI" (initials of the words "Globally Unique AMF ID"), as follows:
  <GUAMI>:=<MCC> <MNC> <AMF Region ID> <AMF Set ID> <AMF Pointer>,
  where "MCC" ("Mobile Country Code") is a code identifying the country, "MNC" ("Mobile Network Code") is a code identifying the operator of the mobile network, "AMF Region ID" identifies the geographical area, "AMF Set ID" uniquely identifies the AMF Set in the geographical area, and "AMF Pointer" uniquely identifies an AMF in the AMF Set.

The document TS 23.501 provides that, in case of failure of an AMF, the client equipments which were served by this AMF are directed toward another AMF of the same AMF Set. To prevent these client equipments having to perform an initial-registration procedure, provision is made for the context data of the client equipments to be shared in real time between all the AMFs of one and the same AMF Set. However, this is constraining from an operational point of view: indeed, if the number of AMFs per AMF Set is small (for example 2), following the failure of an AMF, the other AMFs of the AMF Set must support a significant surplus load (for example double); if conversely the number of AMFs per AMF Set is large (for example 10), the fact that each AMF must possess a copy of the data of all the other AMFs of the AMF Set involves a significant volume of data to be stored in each AMF and to be exchanged between the AMFs. This drawback can be reduced by externalizing the data of the AMF in a database shared between all the AMFs of the AMF Set; however, if the AMFs of an AMF Set are placed at various sites (which ought to be the case in order to limit the impact of an incident on a site, for example a fire), the data must be synchronized in real time between the various sites, thereby involving significant volumes of exchanges.

To solve this problem, 3GPP documents S2-174327 and S2-174328 (meeting of the "TSG SA WG2" group at San Jose del Cabo, Mexico, 26-30 Jun. 2017) propose a method for toggling an AMF, in particular so as to be able to undertake the servicing of this AMF (termed "first AMF"), by a set of replacement AMFs. This toggling is performed by transferring some of the users of the first AMF to each AMF of this set; for example, $\frac{1}{5}^{th}$ of the client equipments previously managed by the first AMF will be taken over by each AMF in a set of 5 replacement AMFs. In this method, a new identifier "AMF name" is introduced to identify an AMF, and the identifier GUAMI (Globally Unique AMF ID), instead of identifying a particular AMF as prescribed in document TS 23.501 mentioned hereinabove, identifies a group of client equipments managed by an AMF at a given instant. The transfer of a group of client equipments to a new AMF is then effected by modifying the association between the GUAMI and the "AMF name": the GUAMI corresponding to the group of client equipments to be transferred, previously associated with the first AMF, becomes associated with a second AMF. The advantage of this procedure is that the client equipments of this group do not need to know the identity of this second AMF, but a drawback is that numerous associations between a certain GUAMI and a certain "AMF name" must be kept up-to-date by all the nodes of the network that need to identify the AMF of a particular client equipment, in particular the radio stations, the SMFs (initials of the words "Session Management Function") and the NRF (initials of the words "Network Function Repository Function").

The present invention therefore relates to a method for toggling a management device in a telecommunications network, in which the operator of the network has defined at least one given set of (N+1) management devices, where N≥2. Said method comprises, for at least one management device of said set, termed "first management device", the following steps:

as long as said first management device is in service:
during the registration of at least one client equipment on the network, the first management device takes responsibility for this client equipment,
this client equipment registers the identity of the first management device, as well as the identity of another management device of said set, termed "second management device", which identity is provided to it by the first management device, and
the first management device shares or synchronizes with said second management device the context data relating to this client equipment, and
if the first management device goes off-service, each second management device is informed thereof and takes responsibility for the client equipments for which it has shared or synchronized the context data with the first management device.

Thus, as and when it takes responsibility for new client equipments, said first management device distributes these client equipments within N groups, each respective group of client equipments being associated with a respective replacement management device of the set (said replacement management device fulfilling at least the same management function as the first management device).

If the first management device of the set goes off-service, each respective replacement management device then takes over only the client equipments of the respective group; the very significant surplus load which would be incumbent on a single replacement management device is thus avoided.

It will be noted that the present invention applies to all cases of toggling, that is to say both in case of replacement (planned) for servicing, and in case of replacement (unplanned) following a fault: indeed, each client equipment registers the identity of the "second" management device which is associated with it, so that if the "first" management device develops a fault, the network will be able to be informed (as described in detail hereinbelow) of the identity of the management device that has to take over this client equipment. On the other hand, the solution, described succinctly hereinabove, of documents S2-174327 and S2-174328 applies only in the case of planned replacement. Moreover, in the present invention, most of the nodes of the network that need to identify the management device of each client equipment (such as the radio stations, the SMFs and the NRF) do not have to store the association between the identifier of each client equipment and the management device responsible for this client equipment.

It will also be noted that, according to the invention, each management device of a set shares or synchronizes with another management device of the same set, before this other management device goes off-service, the context data of the client equipments that it will take over; by virtue of these arrangements, the client equipments managed by a management device that has gone off-service do not have to reregister during the toggling to the replacement management device.

According to particular characteristics, said first management device shares or synchronizes with a second management device context data of a client equipment for which the first management device is responsible, following the registration of this client equipment on the network.

By virtue of these arrangements, the advantages of the toggling according to the invention will be safeguarded if the first management device goes off-service after this initial sharing or this initial synchronization.

According to other particular characteristics, said first management device shares or synchronizes with a second management device context data of a client equipment for which the first management device is responsible, following the reception by the first management device of a message dispatched by this client equipment.

By virtue of these arrangements, the advantages of the toggling according to the invention are obtained while minimizing the number of information exchanges in the network.

According to other particular characteristics, after having taken responsibility for the client equipments for which it has shared or synchronized the context data with the first management device, at least one second management device sends a message containing the list of these client equipments to an entity responsible for the registration of the subscribers to the network. Said entity may, in particular, be a UDM (initials of the words "Unified Data Management").

By virtue of these arrangements, as explained in detail hereinbelow, the load of said entity responsible for the registration of the subscribers to the network is minimized.

According to a second aspect, the invention relates to diverse equipments.

It thus relates, firstly, to a management device, termed "first management device", for a telecommunications network. Said first management device comprises means for:

during the registration of at least one client equipment on the network, taking responsibility for said client equipment,
providing this client equipment with the identity of another management device, termed "second management device", belonging to a given set of (N+1) management devices, where N≥2, comprising said first management device, and
sharing or synchronizing with said second management device the context data relating to this client equipment.

According to particular characteristics, said first management device furthermore comprises means for sharing or synchronizing with a second management device context data of a client equipment for which it is responsible, following the registration of this client equipment on the network.

According to other particular characteristics, said first management device furthermore comprises means for sharing or synchronizing with a second management device context data of a client equipment for which it is responsible, following receipt of a message dispatched by this client equipment.

The invention also relates, secondly, to a management device, termed "second management device", for a telecommunications network. Said second management device comprises means for:

sharing or synchronizing with another management device, termed "first management device", belonging to a given set of (N+1) management devices, where N≥2, comprising said second management device, the context data relating to a client equipment, and if said first management device goes off-service, being informed thereof and taking responsibility for said client equipment.

Said second management device furthermore comprises means for, after having taken responsibility for the client equipments for which it has shared or synchronized the context data with the first management device, sending a message containing the list of these client equipments to an entity responsible for the registration of the subscribers to the network.

Naturally, a management device according to the invention can comprise at one and the same time the means of a "first" management device and the means of a "second" management device.

The management device according to the invention will be able to be, in particular, an AMF. It will also be able to be an SMF (in which case an AMF stores the identity of a second SMF with which a first SMF synchronizes or shares its data).

The invention also relates, thirdly, to a client equipment. Said client equipment comprises means for, in a telecommunications network, receiving from a first management device a message comprising, in a dedicated field, the identity of a second management device, as well as means for registering said identity of the second management device.

According to particular characteristics, said client equipment furthermore comprises means for transmitting said identity of the second management device to said network.

The advantages offered by all these equipments are essentially the same as those offered by the methods set forth succinctly hereinabove.

It will be noted that it is possible to embody these equipments in the context of software instructions and/or in the context of electronic circuits.

According to a third aspect, the invention relates to a telecommunications network. Said telecommunications network comprises:

at least one first management device such as described succinctly hereinabove, at least one second management device such as described succinctly hereinabove, and at least one client equipment such as described succinctly hereinabove.

The advantages offered by this telecommunications network are essentially the same as those offered by the methods set forth succinctly hereinabove.

The invention also envisages a computer program downloadable from a communication network and/or stored on a medium readable by computer and/or executable by a microprocessor. This computer program is noteworthy in that it comprises instructions for the execution of the steps of the method for toggling a management device set forth succinctly hereinabove, when it is executed on a computer.

The advantages offered by this computer program are essentially the same as those offered by said method.

Figure 2B:
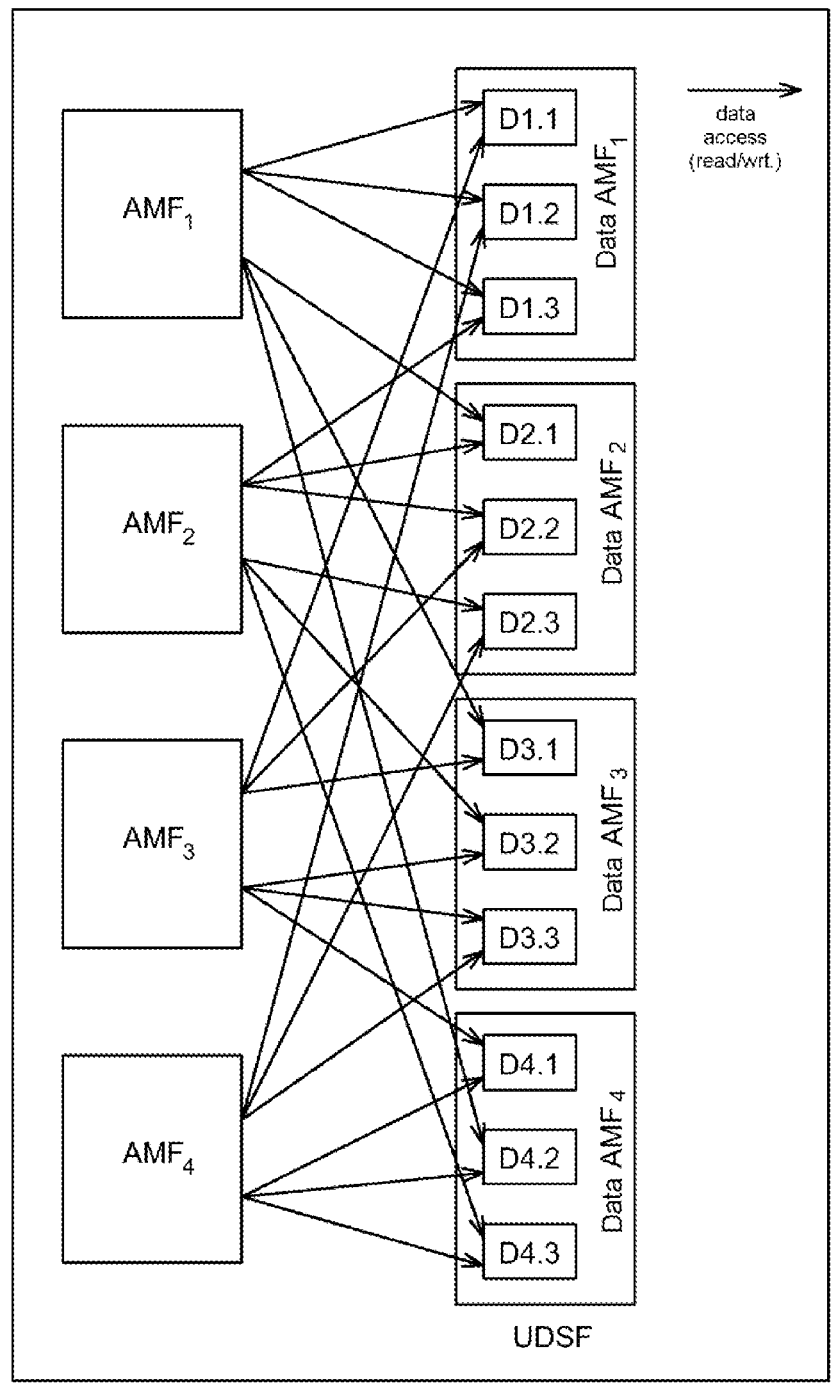
Figure 3:
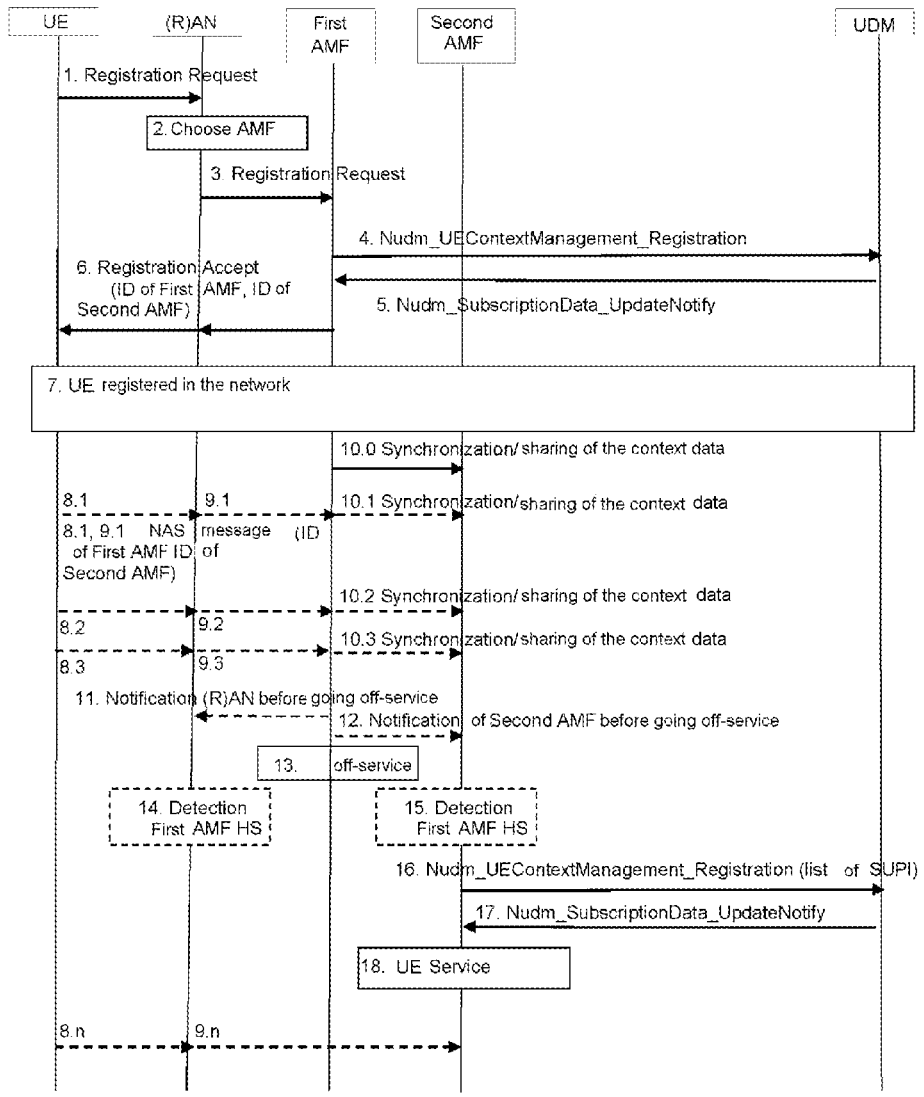

Other aspects and advantages of the invention will become apparent on reading the description detailed hereinbelow of particular embodiments given by way of non-limiting examples. The description refers to the figures which accompany it, wherein:

FIG. 1 represents a 5G network architecture,

FIG. 2a represents the synchronization between two instances of a management function as regards the context data relating to a group of client equipments, according to a first variant of the invention, FIG. 2b represents the sharing between two instances of a management function of the context data relating to a group of client equipments, according to a second variant of the invention, and FIG. 3 represents a method for toggling a management device, according to one embodiment of the invention.

FIG. 1, derived from the document TS 23.501 (FIG. 4.2.3-2), represents a 5G network architecture, comprising a client equipment (UE) connected to a data network (or DN) via:

an Access Network (or AN), the latter being able to be in particular a Radio Access Network (or RAN), and a UPF (initials of the words "User Plane Function") (described hereinbelow).

It is recalled firstly that the "NAS" (Non-Access Stratum) is, in mobile telecommunications systems, a functional layer situated between the core network and a client equipment. The NAS manages the establishment of the communications sessions, and serves to maintain the continuity of the communication with a client equipment in the course of its travels. The NAS is opposed to the "Access Stratum" layer, which is responsible for the transport of information on the wireless portion of the network.

The AMF (Access and Mobility Management Function), mentioned hereinabove, manages the part of the signals of the NAS pertaining to the management of the registration and of the connection of the client equipments. Furthermore, the AMF implements in particular the following functionalities:

termination of the interface of the control plane of the (R)AN, termination of the NAS, encryption and protection of the integrity of the messages, management of the attainment of the client equipments, management of mobility, authentication for access, and authorization of access.

The SMF (Session Management Function), also mentioned hereinabove, manages the part of the signals of the NAS pertaining to the management of the sessions (establishment, modification, release). Furthermore, the SMF implements in particular the following functionalities:

allocation and management of the IP addresses of the client equipments, routing of the traffic at the level of the UPF (described hereinbelow), termination of the interfaces with the network policy control functions, control of the application of the network policy and of the Quality of Service, notification of downlink data, and collection of the billing data, and billing interface.

The other entities illustrated in FIG. 1 are as follows:

the NSSF (initials of the words "Network Slice Selection Function"), which implements in particular the following functionalities:

selection of the set of network slices serving the client equipment, determination of "the AMF Set" or of a list of possible AMFs to serve the client equipment, the AUSF (initials of the words "Authentication Server Function"), which is used for the purposes of client equipment authentication, the UDM (Unified Data Management), also mentioned hereinabove, which implements in particular the following functionalities:

processing of the proofs of authentication, processing of the user identification, authorization of access, management of registration and of mobility, management of subscriptions, the PCF (initials of the words "Policy Control Function"), which implements in particular the following functionalities:

provision, for their application, of the network policy rules to the functions of the control plane, provision, in a database (Unified Data Repository, or UDR), of an access point for obtaining information on the subscriptions necessary in order to be able to apply the network policy decisions, the AF (initials of the words "Application Function"), which interacts with the core network to provide services, for example to implement:

actions on traffic routing, interactions with the network policy control architecture, and the UPF, mentioned hereinabove, which implements in particular the following functionalities:

anchor point for intra- or inter-RAT mobility (RAT are the initials of the words "Radio Access Technology"), routing and retransmission of data packets, inspection of packets and application of the network policy rules in the user plane, report of traffic use, management of the Quality of Service in the user plane, for example filtering of packets, and application of the rate of uplink or downlink packets, marking of the uplink or downlink packets at the transport level, memory buffering of the downlink packets, and triggering of the notification of the downlink data.

Let us now consider a network whose operator has defined at least one "AMF Set", that is to say a given set of (N+1) AMFs, where N is an integer at least equal to 2. The processing of context data relating to a group of client equipments within an AMF Set will now be described according to two variants of the invention, with reference respectively to FIGS. 2a and 2b.

In these variants, the client equipments managed by any AMF of the AMF Set are distributed as a chosen number of N groups, and the data relating to these client equipments are divided into N segments corresponding to these N groups of client equipments. Each of the N segments is synchronized or shared with a single other AMF:

one speaks of "synchronization" when the data of the AMFs are stored in the AMFs themselves; the AMFs then exchange the data directly with each other;

one speaks of "sharing" when the data of the AMFs are stored in an external database, for example a UDSF (Unstructured Data Storage Function); sharing is then effected by giving access to two, and only two, AMFs for each segment of data.

These two variants are illustrated respectively in FIGS. 2a and 2b, with N=3. In these figures, D1.1, D1.2, etc. designate the data of respective groups of client equipments.

It will be noted that it would be possible to extend this principle by synchronizing or sharing the data of a group of client equipments between m>2 AMFs so as to increase resilience, but it is beneficial to limit this number m so as to limit the volume of data to be stored or to be exchanged.

FIG. 3 presents a method for toggling a management device, according to one embodiment of the invention. This embodiment comprises the following steps.

According to a first step, a client equipment sends a registration request to the access network.

According to a second step, the access network allots this client equipment an AMF, termed "first AMF", belonging to a certain AMF Set.

According to a third step, the access network transmits the registration request to the first AMF.

According to a fourth step, in a manner known per se, the first AMF sends a message "Nudm_UE_Context_Management_Registration" to the UDM (mentioned hereinabove) to declare its taking responsibility for this client equipment.

According to a fifth step, in a manner known per se, the UDM sends a confirmation message "Nudm_Subscription-Data_UpdateNotifiy" to the first AMF.

According to a sixth step, the first AMF sends a "Registration Accept" confirmation of registration message to the client equipment via the access network; the client equipment then registers the identity of the first AMF, (for example the GUAMI, described hereinabove). It will be noted that an analogous procedure is described in Section 4.2.2.2.2 of document TS 23.502, as well as in Section 8.2.7.1 and Annex C of document TS 24.501 (transmission and registration of the "5G-GUTI", which contains at one and the same time an identifier of the AMF and a temporary identifier of the client equipment). However, in the present embodiment, the "Registration Accept" message is enriched with the identity of another AMF, termed "second AMF", of the AMF Set, selected by the first AMF for this client equipment; this identity of the second AMF can be advantageously inserted by the first AMF into a field dedicated to the implementation of the present invention of the "Registration Accept" message; the client equipment also registers the identity of the second AMF (for example its GUAMI).

The client equipment is henceforth registered on the network (seventh step). A sharing/synchronization between the first and the second AMF of the context data of this client equipment is then performed immediately (step 10.0).

The sharing/synchronization between the first and the second AMF of the context data of this client equipment is thereafter repeated (steps 8.1-9.1-10.1, 8.2-9.2-10.2, 8.3-9.3-10.3, and so on and so forth) on the occasion of diverse messages dispatched by the client equipment, without the client equipment having to perform any particular procedure to this effect, and in particular without it being necessary to undertake a new authentication of the client equipment. These messages, termed "NAS messages" (Non Access Stratum), can be, for example, a location update, a message of transition between the standby and connected modes, or an end-of-registration request.

Preferably, the client equipment inserts the second AMF's identity, obtained as described hereinabove, into at least one NAS message sent to the access network, for example to a base station such as a gNB; the identity of the second AMF will turn out to be useful in particular in the case where the first AMF goes off-service and cannot receive the NAS messages dispatched by the client equipment; the identity of the second AMF will then serve the access network for steering these NAS messages to the second AMF.

The steps hereinabove are repeated during each allotting of the same first AMF to a new client equipment which is registering on the network, the identity of the "second AMF" being able obviously to vary from one client equipment to another.

Moreover, the sharing/synchronization between the first AMF and each second AMF of the context data of the client equipments concerned is performed continuously.

If, during a thirteenth step, the first AMF goes off-service, the access network is informed thereof, either because it has been notified thereof by the first AMF itself (eleventh step) as specified in Section 5.21.2.2 of document TS 23.501, or because it has detected it by its own means (fourteenth step).

Each of the AMFs of the AMF Set constituting a "second AMF" for the first AMF is likewise informed thereof, either because it has been notified thereof by the first AMF itself (twelfth step), or because it has detected it by its own means (fifteenth step), for example by virtue of a regular exchange of messages of "heartbeat" type with the first AMF.

According to a sixteenth step, each second AMF informs the UDM of the fact that it is henceforth responsible for a certain number of client equipments taken over from the first AMF, so that the future signaling messages can be routed correctly, that is to say via this second AMF, to these client equipments by the network.

It will be noted that the toggling of a management device is carried out conventionally by a procedure termed "Update Location" in 4G, or by sending a "Nudm_UE_Context_Management_Registration" message in 5G, but in an individual manner for each client equipment. In the present embodiment, each second AMF uses a "Nudm_UE_Context Management_Registration" message modified to, on the one hand, indicate to the UDM that the first AMF is off-service, and on the other hand provide the UDM with the list of the client equipments taken over by this second AMF, instead of a single client equipment as in the prior art. These client equipments can for example, in a manner known per se in 5G technology, be identified by their SUPI (Subscriber Permanent Identifier), which is the equivalent of the IMSI (International Mobile Subscriber Identity) in 4G technology. These two modifications make it possible to considerably reduce the load of the UDM, since:
    the UDM receives a single message per second AMF, instead of receiving as many messages as there are client equipments taken over from the first AMF by a second AMF, and
    the UDM can refrain from notifying the first AMF of the fact that these client equipments are no longer managed by the first AMF, whilst the conventional notification in 4G during an MME toggling (Message Cancel Location), respectively in 5G during an AMF toggling ("Nudm_UE_Context_Management_RemoveNotification" message), is dispatched for each client equipment previously managed by the first management device (MME, respectively AMF).

According to a seventeenth step, the UDM sends a "Nudm_SubscriptionData_UpdateNotifiy" confirmation message to the second AMF, analogous to the message of the hereinabove described fifth step.

Finally, according to an eighteenth step, by virtue of the context data previously shared or synchronized with the first AMF, this second AMF takes over directly the relay to serve said group of client equipments. The second AMF then sends its identifier (for example its GUAMI) in a conventional manner, as well as, in compliance with the invention, the identifier of a replacement AMF, to each of the client equipments of this group.

The invention can be implemented within the nodes, for example of the management devices or of the client equipments of communication networks, by means of software components and/or hardware components.

The software components will be able to be integrated into a conventional computer program for network node management. This is why, as indicated hereinabove, the present invention also relates to a computerized system. This computerized system comprises in a conventional manner a central processing unit controlling by signals a memory, as well as an input unit and an output unit. Moreover, this computerized system can be used to execute a computer program comprising instructions for the implementation of any one of the methods for toggling a management device according to the invention.

Indeed, the invention is also aimed at a computer program downloadable from a communication network comprising instructions for the execution of the steps of a method for toggling a management device according to the invention, when it is executed on a computer. This computer program can be stored on a medium readable by computer and can be executable by a microprocessor.

This program can use any programming language, and be in the form of source code, object code, or of code intermediate between source code and object code, such as in a partially compiled form, or in any other desirable form.

The invention is also aimed at an irremovable, or partially or totally removable information medium, readable by a computer, and comprising instructions of a computer program such as mentioned hereinabove.

The information medium can be any entity or equipment capable of storing the program. For example, the medium can comprise a storage means, such as a ROM, for example a CD ROM or a microelectronic circuit ROM, or a magnetic recording means, such as a hard disk, or else a USB key ("USB flash drive").

Moreover, the information medium can be a transmissible medium such as an electrical or optical signal, which can be conveyed via an electrical or optical cable, by radio or by other means. The computer program according to the invention can be in particular downloaded over a network of Internet type.

As a variant, the information medium can be an integrated circuit in which the program is incorporated, the circuit being adapted to execute or to be used in the execution of any one of the methods for toggling a management device according to the invention.

The invention claimed is:

1. A method of toggling a management device in a telecommunications network in which an operator of the telecommunications network has defined at least one given set of (N+1) management devices, where N≥2, the method comprising, by a first management device of said given set of (N+1) management devices, said first management device being in service in the telecommunications network, and for at least one client equipment of the telecommunications network:
    during a registration of the at least one client equipment on the telecommunications network, taking responsibility for the at least one client equipment,
    providing to the at least one client equipment, in a message confirming the registration of the at least one client equipment, an identity of a second management device of the given set of (N+1) management devices, the second management device being selected among the given set for the at least one client equipment, said providing, allowing the at least one client equipment to register an identity of the first management device and the identity of the second management device, and sharing or synchronizing with the second management device context data relating to the at least one client equipment.

2. The method of claim 1, wherein the first management device shares or synchronizes with a second management device context data of a client equipment for which the first management device is responsible after registration of the client equipment on the telecommunications network.

3. The method of claim 1, wherein the first management device shares or synchronizes with a second management device context data of a client equipment for which the first management device is responsible after a reception by the first management device of a message dispatched by the client equipment.

4. The method of claim 1, wherein after sharing or synchronizing with the second management device the context data relating to the at least one client equipment and upon a determination that the first management device has gone off service, the second management device takes responsibility for the at least one client equipment for which the second management device has shared or synchronized the context data with the first management device, and sends a message containing a list of the at least one client equipment and any other client equipment for which the second management device has taken responsibility to an entity responsible for registering subscribers to the telecommunications network.

5. The method of claim 1 further comprising, after synchronizing sharing or synchronizing with the second management device the context data relating to the at least one client equipment and upon a determination that the first management device has gone off-service, informing the second management device that the first management device has gone-off service so that the second management device can take responsibility for the at least one client equipment for which the second management device has shared or synchronized the context data with the first management device.

6. The method of claim 1, further comprising the at least one client equipment registering the identity of the first management device and the identity of the second management device provided by the first management device.

7. A non-transitory computer readable medium having stored thereon instructions, which when executed by a processor, cause the processor to implement the method of claim 1.

8. A computer comprising a processor and a memory, the memory having stored thereon instructions which, when executed by the processor, cause the computer to implement the method of claim 1.

9. A first management device for a telecommunications network, the first management device comprising a processor and a memory, the first management device configured to, while being in service and for at least one client equipment of the telecommunications network:
    take responsibility for the at least one client equipment on the telecommunications network during registration of the at least one client equipment on the telecommunications network,
    provide the at least one client equipment, in a message confirming the registration of the at least one client equipment, with an identity of a second management device for the at least one client equipment, the first and second management devices belonging to a given set of (N+1) management devices, where N≥2, and
    share or synchronize with the second management device context data relating to the at least one client equipment.

10. The first management device of claim 9, wherein the first management device is further configured to share or synchronize with said second management device context data of the at least one client equipment for which the first management device is responsible after the registration of the at least one client equipment on the telecommunications network.

11. The management device of claim 9 wherein the first management device is further configured to share or synchronize with a second management device context data of the at least one client equipment for which the first management device is responsible after receipt of a message dispatched by the at least one client equipment.

12. A telecommunications system, comprising:
    the first management device of claim 9,
    the second management device comprising a processor and a memory, wherein the second management device is configured to:
        share or synchronize with the first management device the context data relating to the at least one client equipment, and
        upon receiving a notification that the first management device has gone off-service, take responsibility for the at least one client equipment, and send a message containing a list of the at least one client equipment and any other client equipment for which the second management device has taken responsibility to an entity responsible for registering subscribers to the telecommunications network, and
    the at least one client equipment, the at least one client equipment comprising a processor and a memory, the at least one client equipment configured to:
        receive from the first management device the message comprising, in a dedicated field, the identity of the second management device, and
        register the identity of the second management device.

13. The telecommunications system of claim 12, wherein the second management device comprises an Access and Mobility Management Function (AMF) or a Session Management Function (SMF).

14. A client equipment comprising a device and a processor, the device configured to in a telecommunications network in which an operator of the telecommunications network has defined at least one given set of (N+1) management devices, where N≥2:
    send, to the telecommunications network, a registration request;
    receive from a first management device of the at least one given set of management devices, the first management device in service in the telecommunications network and having taken responsibility for the device, a message confirming a registration of the client equipment on the telecommunications network;
    retrieve, from a dedicated field of the message received from the first management device of the at least one given set of management devices, an identity of a second management device of the at least one given set of management devices with which the first management device will share or synchronize context data relating to the client equipment, and
    register the identity of the second management device.

15. The client equipment of claim 14, wherein the device is further configured to transmit the identity of the second management device to the telecommunications network.

16. The client equipment of claim 14, wherein the device is further configured to insert the identity of the second management device into at least one Non-Access Stratum (NAS) message sent by the device.

17. The client equipment of claim 14, wherein the device is further configured to:
   retrieve, from a dedicated field of the message received from the first management device, an identity of the first management device; and
   register the identity of the first management device.

18. The client equipment of claim 14, wherein the device is further configured to:
   receive, after the first management device has gone off service, a message from the second management device containing an identifier of the second management device and an identifier of a third management device with which the second management device will share or synchronize context data relating to the client equipment; and
   register the identify of the third management device.

* * * * *